United States Patent [19]

Tate

[11] 3,921,715
[45] Nov. 25, 1975

[54] SECONDARY RECOVERY METHOD
[75] Inventor: Jack F. Tate, Houston, Tex.
[73] Assignee: Texaco Inc., New York, N.Y.
[22] Filed: Dec. 20, 1974
[21] Appl. No.: 534,986

[52] U.S. Cl. .................. 166/271; 166/274
[51] Int. Cl.² .................. E21B 43/27; E21B 43/22
[58] Field of Search ........... 166/271, 270, 273, 274, 166/307, 259, 281, 282; 252/8.55 C, 8.55 D; 175/64

[56]    References Cited
         UNITED STATES PATENTS

| | | | |
|---|---|---|---|
| 1,891,667 | 12/1932 | Carr | 166/307 |
| 2,038,720 | 4/1936 | Groote | 166/307 |
| 2,681,889 | 6/1954 | Menaul et al. | 166/307 |
| 3,353,603 | 11/1967 | Knight | 166/307 |
| 3,434,545 | 3/1969 | Bombardieri | 166/307 |
| 3,441,085 | 4/1969 | Gidley | 166/307 |
| 3,704,751 | 12/1972 | Tate | 166/307 |
| 3,724,544 | 4/1973 | Tate | 166/271 |
| 3,749,169 | 7/1973 | Tate | 166/271 |
| 3,791,446 | 2/1974 | Tate | 166/307 |

OTHER PUBLICATIONS
The Condensed Chemical Dictionary, Eighth Edition, Van Nostrand Reinhold Co., N.Y., 1971, p. 848.

*Primary Examiner*—Stephen J. Novosad
*Attorney, Agent, or Firm*—T. H. Whaley; C. G. Ries; James F. Young

[57]    ABSTRACT

Significant improvement in the recovery of hydrocarbons from a subterranean hydrocarbon-bearing formation containing acid-soluble components is accomplished by injecting into the formation via an injection well drilled into a formation communicating with an adjacent producing well and containing acid-soluble components which may or may not have water-sensitive clays and shales included therein, an aqueous acidic solution of a compound as hereinafter described whereupon the acid component reacts with the acid-soluble components of the formation creating passageways or enlarging existing passageways thus facilitating the flow of fluids therein and the compound prevents post-precipitation of dissolved salts and thereby increases the recovery of hydrocarbons from the formation through the adjacent producing well.

17 Claims, No Drawings

SECONDARY RECOVERY METHOD

FIELD OF THE INVENTION

This invention relates to a method for the recovery of hydrocarbons from subterranean hydrocarbon-bearing formations containing acid-soluble components in which the permeability of the formation communicating between the producing well and adjacent injection well is increased by treating with an aqueous acidic solution of a compound as hereinafter described thereby facilitating the flow of fluids through the formation resulting in increased hydrocarbon recovery via the production well.

DESCRIPTION OF THE PRIOR ART

In recovering oil from oil-bearing reservoirs it usually is possible to recover only a minor part of the original oil in place by the primary recovery methods which utilize the natural forces present in the reservoir. As a result, a variety of supplemental recovery techniques have been utilized to increase the recovery of oil from subterranean hydrocarbon-bearing reservoirs or formations. Although these supplemental techniques are commonly referred to as secondary recovery operations in fact they may be primary or tertiary in sequence of employment. In such techniques, a fluid is introduced into the formation in order to displace the oil therein to a suitable production system through which the oil may be withdrawn to the surface of the earth. Examples of displacing media include gas, aqueous liquids such as fresh water or brine, oil-miscible liquids such as butane, or a water and oil-miscible liquid such as an alcohol. Generally, the most promising of the secondary recovery techniques is concerned with the injection into the formation of an aqueous flooding medium either alone or in combination with other fluids.

In the application of these conventional procedures for the production of hydrocarbons from similar formations by the secondary recovery method of water-injection, one of the principal difficulties that has been encountered is the generally low production response realized because of the low permeabilities and the consequent low rate of water acceptance of the communicating formation. Thus, these unfavorably low responses both in injection rate and in overall production have led to the abandonment of hydrocarbon production by water-injection methods from many carbonate formations after only a minimal amount of the oil-in-place has been produced.

One of the remedial measures that has been used frequently to increase water-injectivity in formations containing acid-soluble components is acid-treating of injection wells to improve the permeability surrounding the injection well bore, and thereby increasing the flow capabilities of the formation in the vicinity of the injection well bore. These measures, however, may result in only a temporary response in production improvement.

In acidizing an injection well utilizing the commonly employed procedure a non-oxidizing mineral acid, such as hydrochloric acid, is introduced into the injection well, and through the application of sufficient pressure is forced into the adjacent formation, where it reacts with the acidsoluble components, particularly the carbonates, to dissolve them to form the respective salt of the acid, carbon dioxide and water, thereby increasing the permeability of the formation adjacent the bore of the injection well. The technique is not limited to application in formations of high acid solubility. Sandstone and gypsum-containing formations may require acidization if the injected water is unstable with respect to $CaCO_3$, $Fe(OH)_3$ or other salts.

If desired, the acidization may be carried out at an injection pressure sufficiently great to create fractures in the strata or formation which has the desired advantage of opening up passageways into the formation along which the acid can travel to more remote areas from the injection well bore. Conversely, fracturing a formation into which a displacing fluid is injected quite often is not desirable since sweep efficiency may be decreased and channelling occur. The salts formed upon neutralization of the acid are extensively water soluble and may pass through the formation dissolved in the displacing fluid.

There are, however, troublesome complications attending the use of hydrochloric acid, or other similar non-oxidizing mineral acids. In the acidizing process, the following primary beneficial reaction occurs:

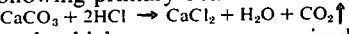

Under the higher pressures required to conduct an acidization, the $CO_2$ is dissolved in the reaction mixture consisting of spent acid and connate water:

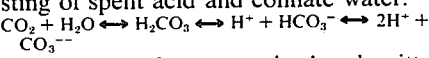

The equilibria may be summarized and written:

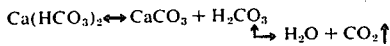

After acidization is complete, the well is often returned directly to injection, the reaction products of the dissolution being forced into the formation in a solution of the displacing fluid. As the fluid moves away from the well bore, pressure diminishes allowing dissolved gases such as $CO_2$ to break out of solution, inducing insoluble carbonates, such as $CaCO_3$ to postprecipitate. Similarly, acid-dissolved iron salts may reprecipitate within the formation as hydrous iron oxides a distance from the well bore when pH rises due to exhaustion of the acid. In like manner, gypsum may precipitate if the injected fluid contains sulfate ion and if its temperature increases within the formation, since the gypsum has an inverse solubility relationship. Precipitation of this type when it occurs within the capillaries of a tight formation can severely lessen the injection rate by plugging wuch capillaries.

It is known that molecularly dehydrated polyphosphates are effective in retarding $CaCO_3$ precipitation. These polyphosphates are unsatisfactory in the method of the present invention because they undergo rapid hydrolysis in the presence of the mineral acid components. As a result, the scale inhibiting properties of these polyphosphates are destroyed. In addition, one hydrolytic reaction product, the phosphate ion ($PO_4^{-3}$), can precipitate with calcium$^{+2}$ or barium$^{+2}$ ions present in the produced water, causing additional plugging or scale deposition and further aggravating the problem. The so-called "glassy" phosphates are known scale inhibitors. However, these glassy phosphates are unsatisfactory because of their slight solubility in acidic media and the tendency to form objectionable hydrolytic reaction products.

It is also known to employ various organic polymers to prevent the precipitation of the mineral salts. Many of these polymeric materials are unstable in mineral acids. In such acidic media they undergo spontaneous depolymerization to an ineffective species. A representative polymeric material which undergoes hydrolysis in the presence of acids is polyacrylamide. In addition, this polymer has a further disadvantage in that it is unstable in aqueous media at temperatures of about 250°F. and upwards. Many wells that are being treated by the method of the present invention have bottom hole temperatures of 250°-300°F. or higher.

The chemically altered natural polymers and natural polymers themselves, are effective inhibitors to prevent the precipitation of mineral salts. However, some materials such as sodium carboxymethylcellulose precipitate or decompose in the presence of mineral acids. Other known sequestering agents such as citric or tartaric acids, and/or complexing agents such as ethylenediaminetetraacetic acid and its water-soluble salts are known inhibitors to prevent the deposition of boiler scale in aqueous media. However, such materials are not applicable in the method of the present invention because they are not appreciably surface-active and do not adsorb on the formation face.

The primary object of the present invention is to provide a method for the improved recovery of hydrocarbon fluids from subterranean fluid-bearing formations wherein a composition comprising an aqueous acidic solution of a compound as hereinafter described is injected into a formation communicating between a producing well and adjacent injection well, said formation containing acid-soluble components and in some instances also containing water-sensitive clays or shales, and whereafter the acid component of the said composition reacts with the acid-soluble components of the formation to increase permeability of the formation thereby facilitating the flow of fluids therethrough and the compound prevents the post-precipitation of compounds formed by the reaction of the acidic component with the formation.

SUMMARY OF THE INVENTION

In accordance with the present invention, there is provided a new and improved method for the recovery of hydrocarbons from subterranean hydrocarbon-bearing formations in which there is injected into the formation via an injection well drilled into a formation communicating with an adjacent producing well and containing acid-soluble components which may or may not have water-sensitive clays included therein, a composition comprising an aqueous acidic solution of a compound as hereinafter described which is capable of reacting with the acid-soluble components of the formation to increase the permeability thereof and the compound component prevents precipitation of compounds formed by the said reaction of the acid component thereby permitting a substantial increase of production of hydrocarbons from the formation via the production well.

An advantage resulting in treating subterranean hydrocarbon-bearing formations having acid-soluble components therein with the aqueous acidic solution of the compound is that the post-precipitation of acid-dissolved salts is prevented or materially decreased. Such post-precipitation whether it be of carbonates from evolution of $CO_2$ from solution, hydrous iron oxides from a rise in pH, or of gypsum from an increase in formation temperature, can lead to plugging of formation capillaries and a consequent reduction of permeability.

Such an event can reduce injectivity and accordingly the rate of production from adjacent wells.

DESCRIPTION OF THE INVENTION

The method of the present invention in its broadest embodiment comprises introducing via an injection well drilled into a hydrocarbon-bearing formation containing acid-soluble components and communicating with a producing well a fluid composition comprising an aqueous acidic solution of a compound as hereinafter described in amounts sufficient to react with the formation so as to increase substantially the flow capability of the formation and to thereafter produce hydrocarbons from the said subterranean formation at an increased rate through the production well.

The compound useful in preparing the aqueous acidic solution of the present invention is a water-soluble substituted taurine having the following general formula:

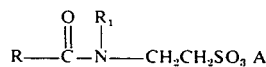

wherein R and $R_1$ are aliphatic hydrocarbon groups, both either saturated or unsaturated (except for the methyl group), each of said groups R and $R_1$ containing from 1 to 20 carbon atoms therein, the sum total of the carbon atoms in both R and $R_1$ being between 9 and 30, and A is an alkali metal or ammonium ion.

Representative substituted taurines include those wherein either the R group or the $R_1$ group is methyl, ethyl, propyl, butyl, pentyl, hexyl, heptyl, octyl, nonyl, decyl, undecyl, tridecyl, tetradecyl, pentadecyl, hexadecyl, heptadecyl, octadecyl, nonadecyl, and eicosyl, including the branched chain and unsaturated variants thereof, such as oleyl. It is to be understood that mixtures of these above named R and $R_1$ group can be used, such as those obtained from coconut, tall oil, tallow and palm oils.

The preferred class of substituted taurines are those wherein the $R_1$ substituent is a relatively low molecular weight aliphatic hydrocarbon group such as methyl, ethyl, propyl, isopropyl, butyl or isobutyl and the other substituent R, is a saturated or unsaturated including branched chain, aliphatic hydrocarbon containing between 8 and 20 carbon atoms, including more specifically such hydrocarbons derived from the coconut, palm and tall oil acids etc., high in oleyl groups.

Preferably, the acidic aqueous treating composition of this invention injected into the hydrocarbon-bearing formation comprises an aqueous solution of from about 0.5 to about 28 percent and preferably 3 to 15 percent by weight of a non-oxidizing mineral acid, such as hydrochloric acid, etc., which contains therein between from about 0.005 to about 2 percent by weight, preferably from about 0.005 to 1 percent of the aforesaid compound.

The aqueous acidic solutions employed in the method of this invention, preferably contain an inhibitor to prevent or greatly reduce corrosion attack on metals. A variety of such inhibitors are known in the art, e.g., certain compounds of arsenic, nitrogen or sulfur as described by Grebe et.al. in U.S. Pat. No. 1,877,504. A small but effective amount of the inhibitor is employed which generally ranges from about 0.02 to about 1.5 percent by weight of the aqueous solution.

In the first step of preparing the aqueous acidic composition of this invention, a solution containing the desired amount of a non-oxidizing mineral acid, such as hydrochloric acid, in water is prepared. An inhibitor to prevent corrosion on the metal equipment associated with the wells is usually added with mixing in the next step. The required amount of the compound is then admixed with the aqueous acid solution.

The method of this invention can be carried out with a wide variety of injection and production systems which will comprise one or more wells penetrating the producing strata or formation. Such wells may be located and spaced in a variety of patterns which are well-known to those skilled in the art. For example, the so-called "line flood" pattern may be used, in which case the injection and producing systems are composed of rows of wells spaced from one another. The recovery zone, i.e., that portion of the producing formation from which hydrocarbons are displaced by the drive fluid to the production system, in this instance will be that part of the formation underlying the area between the spaced rows. Another pattern which is frequently used is the so-called "circular flood" in which the injection system comprises a central injection well while the production system comprises a plurality of production wells spaced about the injection well. Likewise, the injection and production systems each may consist of only a single well and here the recovery zone will be that of the producing strata underlying an elliptical-like area between the two wells which is subject to the displacing action of the aqueous drive fluid. For a more elaborate description of such recovery patterns reference is made to Uren, L. C., *Petroleum Production Engineering-Oil Field Exploitation*, Second Edition, McGraw Hill Book Company, Inc., New York, 1939, and to U.S. Pat. Nos. 3,472,318 and 3,476,182.

In carrying out the method of this invention, the aqueous acidic solution of the compound is forced, usually via a suitable pumping system, down the well bore of an injection well and into the producing formation through which it is then displaced together with hydrocarbons of the formation in the direction of a production well. As those skilled in the art will readily understand, the pressure employed is determined by the nature of the formation, viscosity of the fluid, and other operating variables. The acidization method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand in accordance with known fracturing procedures, may be also employed with the aqueous acidic solution containing the compound.

The formation may be treated continuously with the specific solution or such treatment may be temporary. If desired, however, after a time, conventional flooding may be resumed. The aqueous acidic solution of the compound also may be applied in a modified water flood operation in which there is first injected into the well bore a slug of the aqueous acidic solution of compound which is forced under pressure into the subterranean formation. The first step is then followed by a similar injection step wherein a slug of an aqueous drive fluid, such as water, is injected, which is thereafter followed by a repetition of the two steps. This sequence may be repeated to give a continuous cyclic process. The size of the slugs may be varied within rather wide limits and will depend on a number of conditions, including the thickness of the formation, its characteristics and the conditions for the subsequent injection of the aqueous drive medium.

In the method of this invention, the compound of the composition provides means whereby ions produced by the reaction of the acid component with the formation having tendencies to precipitate as salts such as $CaCO_3$, hydrous iron oxides and $CaSO_4 \cdot 2H_2O$, combine with the compound to form a highly stable complex therewith so that solid salts do not precipitate from the spent treating solution. This binding up of the aforementioned ions from weakly ionizable compounds permits the formed complex to remain dissolved in the treating solution and pass through the formation pores. Further, the compound of the composition provides means whereby the nucleation and growth of the solid itself is thwarted, so that solid salt do not precipitate from the spent treating solution. Finally, the compound component of the composition provides means whereby continuous protection against post-precipitation of salts is obtained for a considerable period of time subsequent to treatment due to continuous slow desorption of the compound from the formation faces. In contrast, use of surfactants having merely dispersant and suspending properties and not possessing the capability of molecularly binding up these produced ions or thwarting the nucleation and growth of solid salts thereof will permit post-precipitation of said salts from such treating solution with the likelihood of plugging up the formation passageways during subsequent recovery of desirable formation hydrocarbons therethrough.

It should be understood that the concentrations of the compound and the acid components are chosen to provide a displacing fluid of the desired rheological properties. Similarly, the appropriate admixture is selected on the basis of the formation being treated as well as other operating conditions employed.

If desired one can also add to the aqueous acidic solution containing the compound a polymeric material to retard the acid component's tendency to attack the calcareous components of the formation. Suitably a polyvinylpyrrolidone as more particularly described in U.S. Pat. No. 3,749,169, issued July 31, 1973 is particularly desirable and the disclosure of said patent is herein incorporated by reference.

EXAMPLE I

Through a water injection well drilled into a limestone formation there is displaced under pressure down the tubing and into the formation an aqueous 8 percent by weight hydrochloric acid solution containing 1 percent by weight, based on the total weight of the solution, a compound consisting of Sodium N, N-methyloleoyltaurate. The pressure required to inject the required volume of water declines considerably and no increase in said pressure is noted subsequent to treatment indicating that post-precipitation of $CaCO_3$ within the formation leading to permeability reduction is prevented or materially lessened. The well is then returned to conventional water injection. After about 4 months the production of hydrocarbons from an adjacent producing well is substantially increased.

EXAMPLE II

A flooding operation is carried out in an oil-containing reservoir in accordance with the process of this invention. Four injection wells are arranged in a rectangular pattern around a single centrally located production well in this system. A slug consisting of 75 barrels of an aqueous acidic solution containing 1 percent by weight, based on the total weight of the solution, of the compound in Example I, in a 9 percent by weight hydrochloric acid, is displaced via each of the four injection wells into the formation at a rate of about 50 bbl/day. In the next step, 100 barrels of water are injected under pressure into the producing formation through each injection well at a rate of about 55 bbl/day. This sequence of operations is repeated numerous times and the result is an increased injection rate of the drive streams into the injection wells and a subsequent increase in the rate of production of hydrocarbons via the production well.

EXAMPLE III

An injection well in a formation containing about 20% HCl-soluble material is treated with 500 gallons of conventional 15% HCl followed by 1,500 gallons of 3% HCl containing 0.5 percent of the same compound as in Example I. The aqueous acidic admixture is displaced from the tubing into the formation with lease water and the well shut-in for 24 hours. Thereafter the well is returned to water injection. The injectivity of the well is materially increased for a sustained period of time resulting in enhanced hydrocarbon recovery.

EXAMPLES IV–IX

The procedure set forth in Examples I–III above is repeated using:

Examples IV–VI — Sodium N, N-methylpalmitoyltaurate

Examples VII–IX — Sodium N, N-methyl tall oil acid taurate

The compounds of the present invention are temperature stable and effective as scale inhibitors at temperatures up to about 150°C. e.g. 100°–150°C.

The compound of Examples I–III above can be prepared in the following manner:

The sodium salt of taurine, NH$_2$CH$_2$CH$_2$SO$_3$Na, is reacted with methyl amine to prepare the intermediate sodium N-methyltaurate. This intermediate is reacted with the acid chloride of oleic acid to complete the preparation of sodium N, N-methyloleyltaurate. The conditions under which this known reaction is conducted is well known in the art, including obvious variations thereof.

Obviously, other modifications and variations of the invention as hereinbefore set forth may be made without departing from the spirit and scope thereof and therefore only such limitations should be imposed as are indicated in the appended claims.

I claim:

1. A method for the recovery of hydrocarbons from a hydrocarbon-bearing formation containing acid-soluble components having at least one injection well and at least one production well penetrating the said formation and in fluid communication, which comprises displacing through the formation an aqueous acidic solution of 0.5 to 28 percent by weight of a non-oxidizing mineral acid and from about 0.005 to about 2 percent by weight of a compound therein, and recovering hydrocarbons through the production well, said compound being a water-soluble substituted taurine having the following general formula:

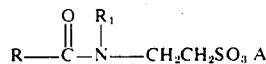

wherein R and R$_1$ are aliphatic hydrocarbon groups, including the corresponding unsaturated aliphatic hydrocarbons, mixtures and isomers, each group containing from 1 to 20 carbon atoms therein, the sum total of the carbon atoms in R and R$_1$ being between 9 and 30, and A is an alkali metal or ammonium ion.

2. Method as claimed in claim 1, wherein said substituted taurine is present in said acidic solution in an amount of from about 0.05 to about 1 percent by weight.

3. Method as claimed in claim 1, wherein the R$_1$ substituent of said substituted taurine is a low molecular weight aliphatic hydrocarbon group containing from one to four carbon atoms therein.

4. Method as claimed in claim 1, wherein the R substituent of said substituted taurine is at least one member selected from the group consisting of saturated aliphatic hydrocarbons, unsaturated aliphatic hydrocarbons, branched chain isomers and mixtures of said hydrocarbons.

5. Method as claimed in claim 1, wherein said substituted taurine is the sodium salt of N, N-methyloleoyltaurate.

6. Method as claimed in claim 1, wherein said substituted taurine is the sodium salt of N, N-methylpalmitoyltaurate.

7. Method as claimed in claim 1, wherein said substituted taurine is the sodium salt of N, N-methylacyl taurate, said acyl substituent being obtained from tall oil acids.

8. Method as claimed in claim 1, wherein in said substituted taurine, R is a mixture of aliphatic hydrocarbon groups obtained from coconut oil acids.

9. Method as claimed in claim 1, wherein in said substituted taurine, R is a mixture of aliphatic hydrocarbon groups obtained from tallow oil acids.

10. Method as claimed in claim 1, wherein in said substituted taurine, R is a mixture of aliphatic hydrocarbon groups obtained from tall oil acids.

11. Method as claimed in claim 1, wherein said acid is present in the solution in an amount of from about 3 to about 15 percent by weight.

12. Method as claimed in claim 1, wherein said acid is hydrochloric acid.

13. Method as claimed in claim 1, wherein said acid is sulfuric acid.

14. Method as claimed in claim 1, wherein said acid is present in the solution in an amount of from about 1 to about 3 percent by weight.

15. Method as claimed in claim 1, wherein the said solution is injected down the injection well bore penetrating said formation under a pressure greater than the formation pressure and sufficient to create fractures in the formation.

16. Method as claimed in claim 1, wherein the said solution is injected down the well bore penetrating said formation under a pressure greater than formation pressure but less than the pressure required to create fractures in the formation.

17. Method for the recovery of hydrocarbons from a hydrocarbon-bearing formation containing acid-soluble components having at least one injection well and at least one production well penetrating the said formation in fluid communication, which comprises displacing through the formation a slug of an aqueous acidic solution of 0.5 to 15 percent by weight of hydrochloric acid and from about 0.05 to 1 percent by weight of a compound therein, said compound being the sodium salt of N, N-methyloleoyltaurate, thereafter injecting a slug of an aqueous drive fluid into the formation to drive the said solution through the formation toward said production well and recovering hydrocarbons through the production well.

* * * * *